INVENTOR
THOMAS B. DELLINGER
BY
Head & Johnson
ATTORNEYS

United States Patent Office 3,364,464
Patented Jan. 16, 1968

3,364,464
DEVICES FOR DETERMINING WHETHER A LARGE DIAMETER DRILLED HOLE WILL ACCEPT CASING
Thomas B. Dellinger, Tulsa, Okla., assignor to Fenix & Scisson, Inc., Tulsa, Okla., a corporation of Oklahoma
Filed Oct. 22, 1965, Ser. No. 501,711
13 Claims. (Cl. 340—18)

ABSTRACT OF THE DISCLOSURE

This invention provides a calibrating device for determining whether a large diameter drilled hole will accept casing. The device includes a body having a longitudinal opening therethrough loosely receiving a drilling string, wheels carried by the body engaging the exterior of the drill string to maintain the body in central position relative to the drill string, gyroscope means carried by the body to maintain the body in preselected axial orientation, rotating wave energy transmitting and receiving means carried by the body for detecting the distance from said body to the wall of the bore hole, a wire line extending from the body whereby the body may be moved vertically on the drill string, and recording means at the earth's surface for recording the distance from the body to the wall of the bore hole as detected by the wave energy transmitting and receiving means. One embodiment of the invention includes a multiplicity of hinged feelers pivotally extending from the body with means of detecting the angle thereof relative to the body which detected angle is recorded as an indication of the bore hole configuration. In another embodiment the invention includes means of suspending the body on a cable and includes means affixed to the cable at a point above the body of maintaining a body freely suspended and spaced from the walls of the bore hole.

---

This invention relates to a method of determining whether a large diameter drilled hole will accept casing. More particularly, the invention relates to improved caliper devices for determining whether an earth bore hole will accept a large diameter casing. Still more particularly, the invention relates to improved caliper devices for running on the exterior of a drill pipe or on a cable for determining the physical characteristics of a bore hole to enable the operator to ascertain whether or not the bore hole will accept a large diameter casing.

In recent years the drilling of large diameter bore holes in the earth has become of increased importance. Such holes are frequently utilized to provide entrance to mines. Another important application is the use of large diameter holes to provide access to underground storage facilities. When holes are drilled for either of these purposes, they must be lined with metal casing to prevent caving and as a seal to prevent the flow of water downwardly within the bore hole from upper water bearing formations.

It is well known that a drilled bore hole in the earth is seldom in perfectly vertical alignment. In many applications a degree of misalignment may be tolerated. For instance, in the petroleum industry wherein relatively small diameter casing is utilized a degree of misalignment is not deleterious since the smaller diameter casing is flexible and bends easily around curved portions in the hole and usually no difficulty is experienced in positioning small diameter casing in drilled bore holes.

However, with large diameter casings the problem is considerably more serious. This is caused by several factors. One is that large diameter holes are more susceptible to cave-ins and washouts with the resultant impairment of the accuracy of the hole diameter. Second, the larger bits are more difficult to maintain in the vertical path as the force tending to depart the bit from the vertical as the bit encounters enclined earth stratas is more pronounced. Third, the large diameter casing is substantially inflexible and will not bend to accommodate curved bore holes as readily as will the smaller diameter casing utilized in the petroleum industry.

For these reasons a serious problem has existed in the drilling of large diameter casing in that no accurate and dependable means exists for determining whether a drilled hole will accept casing. This problem is extremely serious in light of the installation procedures normally used to install large diameter casing in bore holes. In the petroleum industry where smaller diameter casings are used, lengths of casing are threaded together by means of couplings and, during the insertion of the casing in the hole, if a point is reached where the hole refuses to accept the casing, it can be relatively easily removed by unthreading the lengths of casing from each other. On the other hand when a hole has been completed and the operator begins the process of installing large diameter casing, it is a completely different process. Large diameter casing is normally not held together by threaded couplings but is welded one joint to another. If the operator, in installing a length of large diameter casing, finds the hole will not accept the casing, the casing must be removed by cutting the lengths apart and, of course, must be rewelded again as they are inserted for the second time. For this reason and others, it is exceedingly important that some means be provided for determining in adavnce whether a bore hole will accept large diameter casing.

It is therefore an object of this invention to provide improved caliper devices for use in determining whether a bore hole will accept a large diameter casing.

This primary object and other subsidiary objects will be fulfilled by reference to the following description and claims, taken in conjunction with the attached drawings in which:

Figure 1:
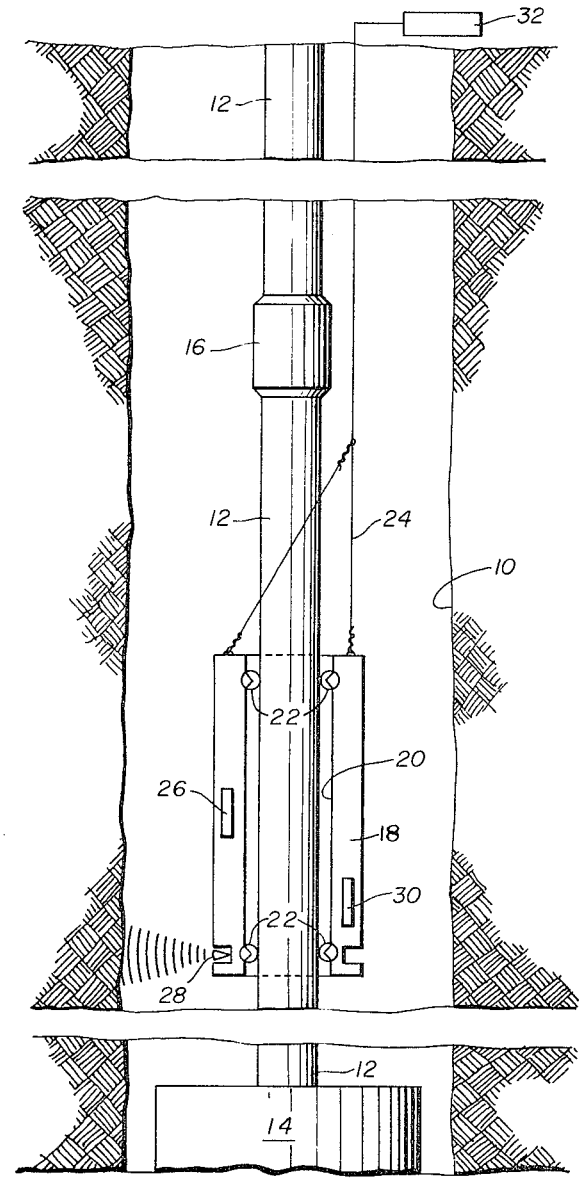
FIGURE 1 is a cross-sectional view showing a length of drill pipe in a bore hole and showing an improved caliper device of this invention for running on the exterior of the drill pipe to ascertain the characteristics of the bore hole and thereby enable the operator to determine whether the bore hole will accept a large diameter casing.

Referring now to the drawings and first to FIGURE 1, a bore hole 10 formed in the earth is shown in which is positioned a drill string 12 having at the lower end thereof a bit 14. The drill string 12 includes a series of lengths of drill pipe held together by couplings 16.

The improved caliper of this invention includes a body 18 having an opening 20 which freely receives the drill pipe 12. Within the body 18 are a series of spring supported wheels 22 which roll upon the exterior of the drill string 12 and maintain the body 18 in axial alignment with the drill string. Wheels 22 are supported in a way to permit passage over couplings 16.

A wire line 24 is attached to the top of the body 18 and extends to the earth's surface as a means of raising and lowering the caliper on the drill pipe.

Supported by the body is a gyroscope 26 which maintains the body 18 in preselected axial orientation and, in addition, gyroscope 26 may be utilized to convey information of the axial displacement of body 18 relative to the vertical.

Carried by the body is a wave energy transmitting and receiving means 28 which transmits an energy signal that is reflected by the wall of the bore hole 10 and received. The wave energy transmitting and receiving means 28 provides a distance measurement from the body to the wall of the bore hole. The wave energy transmitting and receiving means 28 is rotated around the body 18 to provide a sequential and continuous measurement of the distance from the body to the wall of the bore hole.

A recorder 30 is carried by the body 18 by which the distance measured by the wave energy transmitting and receiving means 28 is recorded as it circles around the body. Additionally, the recorder 30 may be utilized to provide a record of the angle of pivotation of the body 18 relative to the vertical as detected by the gyroscope 26.

An alternate arrangement includes the provision of a recorder 32 at the surface in which event the recorded information is transmitted by an electrical cable carried by the wire line 24.

The wave energy transmitting and receiving means 28 includes means utilizing either electro magnetic waves or acoustical waves.

Figure 2:
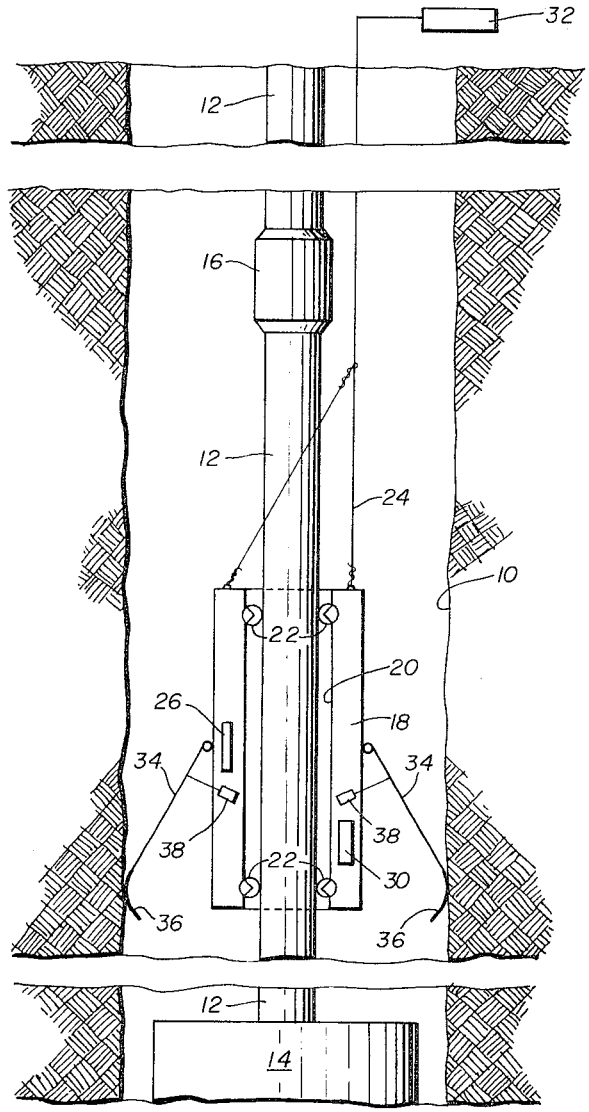
FIGURE 2 is a cross-sectional view as shown in FIGURE 1 but showing an alternate means of determining the bore hole configuration.

FIGURE 2 shows an alternate arrangement wherein, instead of a wave energy transmitting and receiving means as shown in FIGURE 1, mechanical feelers 34 are hinged pivotally from the exterior of body 18. The feelers 34 have a curved portion 36 at the outer end which engage the walls of bore hole 10 and allow the feelers to slide as the caliper is moved up and down the hole. Affixed to each of the pivoted feelers 34 is an angle detecting device 38 by which the angle of pivotation relative to the body of each feeler 34 is indicated. The output of the angle detectors is fed to the recorder 30 in the same way as the wave energy transmitting and receiving means of the arrangement of FIGURE 1.

At least three and preferably four feelers 34 are provided, each in spaced relationship to the others and preferably in a plane vertical to the longitudinal axis of the body 18.

Figure 3:
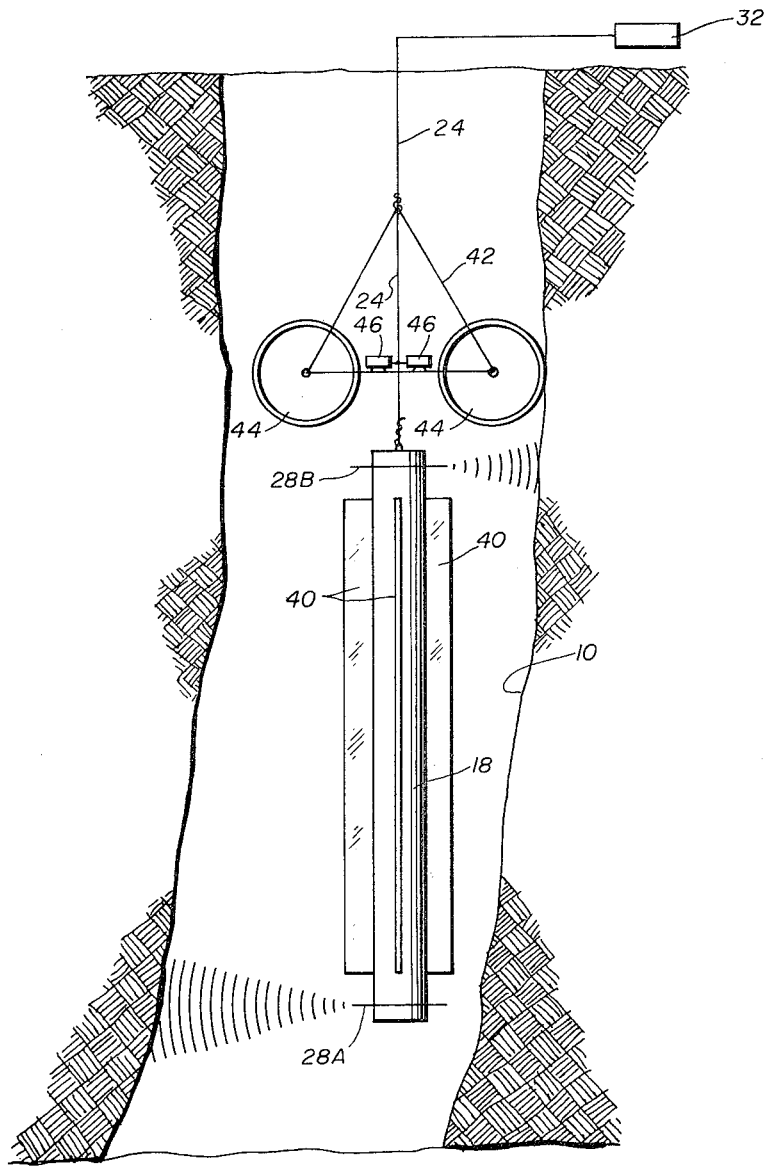
FIGURE 3 is a cross-sectional view as shown in FIGURES 1 and 2 showing an arrangement wherein the caliper of this invention is suspended on a cable in a bore hole in an arrangement wherein the survey of the bore hole is made after the drill pipe has been removed.

FIGURE 3 shows an alternate arrangement for determining the characteristics of a bore hole after the drill pipe has been removed. In this arrangement, the caliper body 18 is suspended at the end of a wire line 24. The body 18 is provided with radial vanes 40 as a means of diminishing the tendency of the body to rotate as suspended on cable 24. In the arrangement shown in FIGURE 3, two wave energy transmitting and receiving means 28A and 28B are provided, one being located adjacent the bottom of body 18 and the other at the top. Each of the wave energy transmitting and receiving means 28A and 28B rotate continuously around body 18 as the record of the shape of the bore hole is being made. By the utilization of two spaced apart wave energy transmitting means 28A and 28B, a comparison of the detected difference in distance between the body and the bore hole provides an indication of the departure of the bore hole from the vertical. The information detected by the wave energy transmitting and receiving means 28A and 28B is communicated by a cable portion of wire line 24 to a surface recorder 32.

To keep the caliper body 18 away from the walls of the bore hole 10, a centering structure 42 is used having spaced wheels 44 which roll upon the wall of the bore hole 10. The caliper body 18 is suspended by an extension of the wire line and electrical cable 24. To control the tendency of the caliper body 18 to sway on the suspended cable 24, dashpots 46 are utilized.

While in FIGURES 1 and 2 the recorder may be carried within the caliper body 18 as shown, a preferred arrangement is to locate the recorder, identified by numeral 32, at the surface. With the recorder at the surface, the relationship of the record obtained to the depth of the hole from the surface is more easily achieved.

As indicated in FIGURES 1 and 2, gyroscope 26 may be utilized both to afford axial alignment of the body and to provide a recordable signal of the deviation of the body from the vertical. However, it is understood that other deviational instruments may be utilized. The recorders, whether carried by the body or located at the surface, may be of the multiple trace type recording, preferably, on photographic film. In the arrangement of FIGURE 2, the angle of pivotation of each feeler 34 relative to the body is independently recorded.

The improved calipers of this invention provide means of ascertaining the physical characteristics of an earth bore hole. With the record available, analysis of the size, shape, deviation, curvature and other physical characteristics of the bore hole may be computed and from such computed information the operator will be able to determine beforehand whether a large diameter casing will be accepted by the bore hole.

While this invention has been described with a certain degree of particularity, it is manifest that many changes may be made in the details of construction and the arrangement of components without departing from the spirit and scope of this disclosure.

What is claimed:

1. A caliper device for running on the exterior of a drilling string within a bore hole comprising
   a body having a longitudinal opening therethrough loosely receiving the drilling string,
   wheels carried by said body engaging the exterior of the drilling string to maintain the body is centered position relative to the drill string,
   a gyroscope carried by said body to maintain the body in preselected axial orientation,
   wave energy transmitting and receiving means carried by said body for detecting the distance from said body to the wall of the bore hole,
   means of rotating said wave energy transmitting and receiving means in a horizontal plane around said body,
   a wire line extending from said body whereby the body may be moved vertically on the drill string, and
   recording means for recording the distance from said body to the wall of the bore hole as detected by said wave energy transmitting and receiving means.

2. A caliper device according to claim 1 wherein said wave energy transmitting and receiving means includes electromagnetic transmitting and receiving means.

3. A caliper device according to claim 1 wherein said wave energy transmitting and receiving means includes acoustical energy transmitting and receiving means.

4. A caliper device according to claim 1 wherein said recording means is carried by said body.

5. A caliper means according to claim 1 wherein said recording means is remotely located and including a signal conductor extending from said wave energy transmitting and receiving means to said remote recording means.

6. A caliper device for running on the exterior of a drilling string within a bore hole comprising
   a body having a longitudinal opening therethrough loosely receiving the drilling string,
   wheels carried by said body engaging the exterior of the drilling string to maintain the body in centered position relative to the drill string,
   a gyroscope carried by said body to maintain the body in preselected axial orientation,
   a multiplicity of hinged feelers pivotally extending from said body and biased outwardly in spaced relationship and in a horizontal plane,
   means with each of said feelers of detecting the angle thereof relative to said body,
   a wire line extending from said body whereby the body may be moved vertically on the drill string, and
   recording means receiving and recording the angle of pivotation of each of said feelers relative to said body.

7. A caliper device according to claim 6 wherein said recording means is carried by said body.

8. A caliper device according to claim 6 wherein said recording means is remotely located and including a signal conductor extending from each of said feeler angle detector means to said remotely located recording means.

9. A caliper device for use in determining whether a bore hole will accept a large diameter casing comprising an elongated body,
   a cable affixed to the upper end of the body by which the body is freely suspended in the bore hole, the cable extending to the earth's surface,
   means affixed to said cable at a point above said body of maintaining said freely suspended body spaced from the walls of said bore hole,
   wave energy transmitting and receiving means carried by said body for detecting the distance from said body to the wall of said bore hole,
   means of rotating said wave energy transmitting and receiving means around said body in a horizontal plane, and
   recording means for recording the distance from said body to the wall of the bore hole as detected by said wave energy transmitting and receiving means.

10. A caliper device according to claim 9 including longitudinal vanes affixed to the exterior of said body and extending therefrom in spaced relationship, said vanes serving to lessen the tendency of said body to rotate on said line.

11. A caliper device according to claim 9 including a first and second wave energy transmitting and receiving means carried by said body in spaced longitudinal relationship, each of said transmitting and receiving means connected to said recording means for independent recordation of the detected distance between said body and the walls of the bore hole.

12. A caliper device according to claim 9 wherein said wave energy transmitting and receiving means includes electromagnetic wave energy transmitting and receiving means.

13. A caliper device according to claim 9 wherein said wave energy transmitting and receiving means included acoustical wave energy transmitting and receiving means.

References Cited

UNITED STATES PATENTS

| | | |
|---|---|---|
| 1,339,955 | 5/1920 | Hardel. |
| 1,540,169 | 6/1925 | Dymond _____ 166—54.5 X |
| 1,898,074 | 2/1933 | Bailey _____ 166—241 |
| 2,012,138 | 8/1935 | Palmer et al. _____ 166—4 |
| 2,595,241 | 5/1952 | Goble. |
| 2,648,056 | 8/1953 | Jakosky _____ 181—.5 X |
| 2,725,486 | 11/1955 | Walstrom _____ 33—205 X |
| 2,924,289 | 2/1960 | Ferre _____ 181—.5 |

BENJAMIN A. BORCHELT, *Primary Examiner.*

R. M. SKOLNIK, *Assistant Examiner.*